United States Patent Office 3,337,605
Patented Aug. 22, 1967

3,337,605
BIS(FLUOROIMINO) COMPOUNDS
George N. Sausen, Wilmington, Del., assignor to E. I. du Pont de Nemours and Company, Wilmington, Del., a corporation of Delaware
No Drawing. Filed Dec. 29, 1961, Ser. No. 163,073
5 Claims. (Cl. 260—465.5)

This invention relates to, and has as its principal object provision of, a new class of nitrogen-fluorine compounds.

The products of this invention are bis(fluoroimino) compounds of the formula $$\begin{matrix} NF & NF \\ \| & \| \\ R-C\text{----}C-R' \end{matrix}$$

where R and R' are the same or different and are halogen, e.g., fluorine and chlorine; hydrocarbon, e.g., methyl, isopropyl, cyclohexyl, β-naphthyl, dodecyl; halohydrocarbon, e.g., trichloromethyl, 2,2,3,3-tetrafluorocyclobutyl, chlorodifluoromethyl, o - chloromethylphenyl, 12-chlorododecyl;
carboxyl; halocarbonyl.

$$\begin{matrix} O \\ \| \\ -C-X \end{matrix}$$

where X is halogen; cyano, CN; hydrocarbyloxycarbonyl, $$\begin{matrix} O \\ \| \\ -C-OQ \end{matrix}$$

carbamoyl, $$\begin{matrix} O \\ \| \\ -C-NH_2 \end{matrix}$$

hydrocarboncarbamoyl, $$\begin{matrix} O \\ \| \\ -C-NHQ \end{matrix}$$

and dihydrocarboncarbamoyl, $$-\overset{O}{\overset{\|}{C}}-N\overset{Q'}{\underset{Q}{<}}$$

where Q and Q' are the same or different monovalent hydrocarbon groups (e.g., ethyl, tert-butyl, cycloheptyl, nonyl, 2-(α-naphthyl)ethyl, and where, in the formula $$-\overset{O}{\overset{\|}{C}}-N\overset{Q'}{\underset{Q}{<}}$$

Q and Q' can be joined together to form a divalent hydrocarbon group (e.g., ethylene, 2,5-dimethylhexamethyl, 3-phenylpentamethylene); and where R and R' joined together are divalent hydrocarbon, e.g., ethylene, 1-cyclopentyltrimethylene, o - phenylenedimethylene, dodecamethylene; with the provisos that R and R' are free of aliphatic unsaturation and that any halogen is of atomic number 9–17 (fluorine and chlorine).

For reasons of availability, preferred values of R and R' are those described above in which R and R' each contain 1–12 carbons, or in which R and R' joined together contain a total of 12 carbons. An especially preferred group is that in which R and R' are the same and are hydrocarbon of up to and including seven carbons, lower perfluoroalkyl, and cyano, and where R and R' joined together are methylene or polymethylene of up to and including seven carbons.

The products of this invention can be made by one or either of two processes.

In the first process, dinitrogen tetrafluoride ($N_2F_4$) is reacted with a disubstituted acetylene, R—C≡C—R', where R and R' are as defined above, by the method described in my application Ser. No. 137,507, filed Sept. 12, 1961. Bis(fluoroimino) compounds of the present invention are formed, in addition to the products described in the earlier application:

$$R-C\equiv C-R' + N_2F_4 \longrightarrow \underset{\underset{R-C\text{----}C-R'}{\|\;\;\;\;\;\|}}{NF\;\;\;NF} + \underset{\underset{R-C=\!\!=C-R'}{|\;\;\;\;\;|}}{NF_2\;NF_2} +$$

$$\underset{\underset{R-C\text{----}CF-R'}{\|\;\;\;\;\;|}}{NF\;\;\;NF_2} + \underset{\underset{R-CF\text{----}C-R'}{|\;\;\;\;\;\|}}{NF_2\;NF}$$

In general, longer reaction times and higher temperatures favor the formation of the bis(fluoroimino) compounds.

In the second process, $N_2F_4$ is reacted with a disubstituted ethylene, R—CH=CH—R', where R and R' are as defined in column 1, to give an intermediate bis(difluoroamino) compound that is dehydrofluorinated in the presence of a hydrogen fluoride acceptor to give the products of the present invention:

$$R-CH=CH-R' \xrightarrow{N_2F_4} \underset{\underset{R-CH-CH-R'}{|\;\;\;\;\;|}}{NF_2\;NF_2} \xrightarrow{-2HF} \underset{\underset{R-C\text{----}C-R'}{\|\;\;\;\;\|}}{NF\;\;NF}$$

It is possible, but not necessary, to isolate the intermediate bis(difluoroamino) compound. Either the cis or trans form of the disubstituted ethylene can be used.

The second process is usually carried out at 50–150° C. and at atmospheric pressure or at the autogenous pressure of a closed system. A variety of hydrogen fluoride acceptors can be used; typical examples are sodium fluoride and sodium carbonate. The hydrogen fluoride acceptor is usually added at the start of the process but in some cases can be added after the intermediate has been formed.

The products of this invention are crystallizable solids or distillate liquids, soluble in common organic solvents such as acetone, acetonitrile, benzene, ethyl alcohol, ethyl ether, and petroleum ether. They are stable to air and moisture at room temperatures except where the groups R or R' or both contain functions, e.g., fluorocarbonyl, $$\begin{matrix} O \\ \| \\ -C-F \end{matrix}$$

that are not stable to one or both of those agents. They are useful as polymerization initiators.

The following nonlimiting examples illustrate the products of this invention.

EXAMPLE 1

*Bis(fluoroimino)bibenzyl*

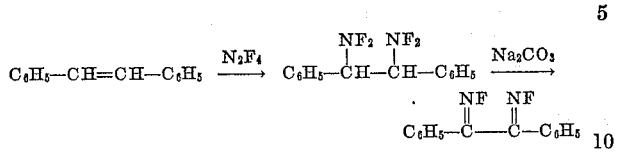

An 80-cc. "Hastelloy" C [1]-lined shaker tube was charged with 10 g. of trans-stilbene, 25 g. of benzene, and 7 g. of $N_2F_4$. The tube was sealed, heated at 60° C. with shaking for two hours, cooled, and opened. The benzene was evaporated under reduced pressure, 50 g. of acetonitrile and 20 g. of sodium carbonate were added, and the mixture was boiled under reflux with stirring for 18 hours and cooled. The solid was removed by filtration, and the solvent was evaporated under reduced pressure to leave an oily residue. Recrystallization of this crude product from low-boiling petroleum ether gave 3.5 g. (26% of white, crystalline bis(fluoroimino)bibenzyl, $$C_6H_5C(=NF)C(=NF)C_6H_5$$

M.P. 68–69° C. An additional 2.5 g. of crude, oily bis-(fluoroimino)bibenzyl was obtained from the mother liquor.

*Analysis.*—Calcd. for $C_{14}H_{10}N_2F_2$: C, 68.84; H, 4.13; N, 11.48; F, 15.55. Found: C, 69.42; H, 4.42; N, 11.80; F, 15.33.

The infrared spectrum of the product (mineral-oil mull) showed absorption at 6.24μ and 6.34μ (C=N) and 11.44μ (=N—F). The ultraviolet spectrum (ethyl alcohol solution) had $\lambda_{max}$=245 mμ (ε=14,000). The $F^{19}$ n-m-r (nuclear magnetic resonance) spectrum had a single peak at —5765 c.p.s. (56.4 mc., 1,2-difluorotetrachloroethane=0).

The above product can also be made in one step by heating together a mixture of cis- or trans-stilbene, $N_2F_4$, and sodium fluoride in acetonitrile solvent.

EXAMPLE 2

*2,3-bis(fluoroimino)hexafluorobutane*

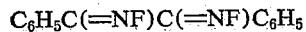

The shaker tube of Example 1 was charged with 12 g. of hexafluoro-2-butyne and 7.6 g. of $N_2F_4$, sealed, heated for four hours with shaking at 195° C., and cooled. The product was distilled into a cylinder cooled to —190° C.; it weighed 18.7 g. After removal of volatile material under reduced pressure at —61° C., the residual liquid was distilled through a 10″ spinning-band column. The forerun, B.P. 32–43° C., was found to contain 2,3-bis(fluoroimino)hexafluorobutane, $CF_3C(=NF)C(=NF)CF_3$. The infrared spectrum of this fraction had absorption at 6.1μ and 6.15μ (C=NF), 8μ (C—F), and 10–11μ (N—F). Mass-spectrometric analysis showed a parent peak (m/e 228+) and derivative ions in agreement with the above structure.

The product of the foregoing example can also be made from 1,1,1,4,4,4-hexafluorobutene and $N_2F_4$ in the presence of sodium fluoride as hydrogen fluoride acceptor and acetonitrile as solvent.

[1] "Hastelloy" C is the trade name of a well-known alloy of iron, nickel, and molybdenum.

EXAMPLE 3

*Bis(fluoroimino)succinonitrile*

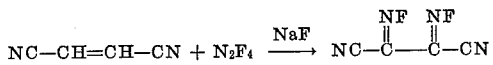

The shaker tube of Example 1 was charged with 5.0 g. of fumaronitrile, 5.9 g. of $N_2F_4$, 8 g. of anhydrous sodium fluoride, and 8.8 g. of benzene. The tube was sealed, heated with shaking at 145° for 5.5 hours, cooled, and opened. The liquid product, after removal of gases, was filtered to separate the solid sodium fluoride/sodium bifluoride mixture. The filtrate was concentrated to leave 4.1 g. of crude bis(fluoroimino)succinonitrile, $$NCC(=NF)C(=NF)CN$$

The product was purified by sublimation to give the bis (fluoroimino) compound as a white solid, M.P. 77–78°.

*Analysis.*—Calcd. for $C_4N_4F_2$: N, 39.5; F, 26.8. Found: N, 39.42, 39.68; F, 26.11.

The infrared spectrum showed absorption at 4.4μ (C≡N) and 6.26μ, 6.37μ, and 6.42μ (C=NF), with no C—F nor C—H absorption. Mass-spectrometric analysis showed a parent peak (m/e 142+) and a series of ions logically derived from it. Fluorine n-m-r showed one broad resonance for N—F at —8412 c.p.s. (56.4 mc., 1,2-difluorotetrachloroethane=0) in agreement with the above structure.

EXAMPLE 4

*Bis(fluoroimino)succinonitrile*

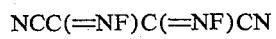

The shaker tube of Example 1 was charged with 3.6 parts of dicyanoacetylene and 10.4 parts of $N_2F_4$, sealed, heated at 140° C. with shaking for 3.5 hours, and cooled. After removal of gaseous products, the liquid product was separated by gas chromatography. One of the resulting fractions was shown by mass-spectrometric analysis to be bis(fluoroimino)succinonitrile.

EXAMPLE 5

*1,2-Bis(fluoroimino)cyclohexane*

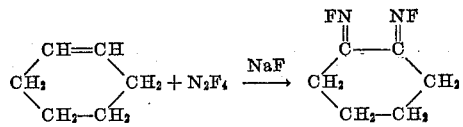

The shaker tube of Example 1 was charged with 4 g. of cyclohexene, 15 g. of acetonitrile, 10 g. of powdered sodium fluoride, and 5.5 g. of $N_2F_4$. The tube was sealed and heated slowly until a pressure drop was observed (at 57° C.). It was then heated at 125° C. with shaking for three hours, cooled, and opened. The solid was removed by filtration, the acetonitrile was evaporated under reduced pressure, and the residue was distilled to give 2.5 g. (34.5%) of 1,2-bis(fluoroimino)cyclohexane as a colorless liquid, B.P. 65–67° C./0.2 mm.

*Analysis.*—Calcd. for $C_6H_8N_2F_2$: C, 49.30; H, 5.47; N, 19.20; F, 26.00. Found: C, 50.70; H, 5.82; N, 18.85; F, 26.54.

The infrared spectrum of the product showed absorption at 5.9μ, 6.0μ, and 6.1μ (C=N). The $F^{19}$ n-m-r spectrum had a single peak at —5655 c.p.s. (56.4 mc.; 1,2-difluorotetrachloroethane=0).

Additional examples of products falling within the scope of this invention are listed in the following, self-explanatory, Tables I and II.

TABLE I.—BIS(FLUOROIMINO) COMPOUNDS FROM DISUBSTITUTED ACETYLENES

| Acetylenic Reactant | Bis(fluoroimino) Compound |
|---|---|
| $C_2H_5-C\equiv C-C_2H_5$ | $C_2H_5-C(=NF)-C(=NF)-C_2H_5$ |
| cyclopentyl-$CH_2-C\equiv C-CH_3$ | cyclopentyl-$CH_2-C(=NF)-C(=NF)-CH_3$ |
| $(CH_3)_3C\text{-}CHCl-C\equiv C-CH_2Cl$ | $(CH_3)_3C\text{-}CHCl-C(=NF)-C(=NF)-CH_2Cl$ |
| $CH_3\text{-}C_6H_4\text{-}C\equiv C\text{-}C_6H_4\text{-}CH_3$ | $CH_3\text{-}C_6H_4\text{-}C(=NF)-C(=NF)\text{-}C_6H_4\text{-}CH_3$ |
| $C_6H_5CH_2-C\equiv C-CH_3$ | $C_6H_5CH_2-C(=NF)-C(=NF)-CH_3$ |
| $CH_3OOC-C\equiv C-COOCH_3$ | $CH_3OOC-C(=NF)-C(=NF)-COOCH_3$ |
| $\alpha\text{-}C_{10}H_7-C\equiv C-CONH_2$ | $\alpha\text{-}C_{10}H_7-C(=NF)-C(=NF)-CONH_2$ |
| $n\text{-}C_6H_{13}-C\equiv C-COCl$ | $n\text{-}C_6H_{13}-C(=NF)-C(=NF)-COCl$ |
| $(CH_3)_3C-C\equiv C-CON(\text{morpholinyl})$ | $(CH_3)_3C-C(=NF)-C(=NF)-CON(\text{morpholinyl})$ |

TABLE II.—BIS(FLUOROIMINO) COMPOUNDS FROM DISUBSTITUTED ETHYLENES

| Ethylenic Reactant | Bis(fluoroimino) Compound |
|---|---|
| $C_6H_5-CH=CH-(CH_2)_3CH_3$ | $C_6H_5-C(=NF)-C(=NF)-(CH_2)_3CH_3$ |
| $n\text{-}C_8H_{17}-CH=CH(CH_2)_8Cl$ | $n\text{-}C_8H_{17}-C(=NF)-C(=NF)-(CH_2)_8Cl$ |
| 2,4,6-trimethylphenyl-$CH=CHCl$ | 2,4,6-trimethylphenyl-$C(=NF)-C(=NF)-Cl$ |
| $CHF=CHF$ | $F-C(=NF)-C(=NF)-F$ |
| 2-chlorophenyl-$CH=CH-C_6H_5$ | 2-chlorophenyl-$C(=NF)-C(=NF)-C_6H_5$ |
| $n\text{-}C_3F_7-CH=CH-COOH$ | $n\text{-}C_3F_7-C(=NF)-C(=NF)-COOH$ |
| cyclopentyl-$CH_2-CH=CH-CONH(CH_2)_{10}CH_3$ | cyclopentyl-$CH_2-C(=NF)-C(=NF)-CONH(CH_2)_{10}CH_3$ |
| $CF_3-CH=CH-COO-CH(\text{cyclohexyl})$ | $CF_3-C(=NF)-C(=NF)-COOCH(\text{cyclohexyl})$ |
| 4-isopropyl-cyclohexene (with $CH=CH$) | 4-isopropyl-cyclohexane with $C(=NF)-C(=NF)$ |
| cyclodecene ($CH=CH-(CH_2)_8$ ring) | cyclodecane with $C(=NF)-C(=NF)-(CH_2)_8$ ring |

As shown by the following examples, the products of this invention are useful as polymerization initiators.

EXAMPLE A

The shaker tube of Example 1 was charged with 10 g. of tetrafluoroethylene, 0.05 g. of bis(fluoroimino)succinonitrile, and 30 g. of perfluorodimethylcyclobutane (solvent). The tube was heated at 150° C. for six hours with shaking, cooled, and opened. A total of 0.02 g. of solid polytetrafluoroethylene was obtained.

EXAMPLE B

A collapsible platinum tube was charged with 0.005 g. of bis(fluoroimino)bibenzyl, 3 g. of perfluorodimethylcyclobutane (solvent), and 0.37 g. of ethylene. The tube was sealed, heated in an autoclave for four hours at 150° C. and 1000 atmospheres external pressure, cooled, and opened. There was obtained 0.19 g. of solid polyethylene.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

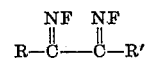

wherein any halogen is of atomic number 9–17 and R and R' are free from aliphatic unsaturation and are selected from the group consisting (A), individually, of fluorine, chlorine, monovalent hydrocarbon of up to 12 carbons, monovalent halogenated hydrocarbon of up to 12 carbons, carboxyl, halocarbonyl, cyano, hydrocarbyloxycarbonyl of up to 12 carbons, carbamoyl, hydrocarboncarbamoyl of up to 12 carbons, and dihydrocarboncarbamoyl of up to 12 carbons, and (B), jointly, of divalent hydrocarbon of up to 12 carbons.

2. Bis(fluoroimino)bibenzyl.
3. 2,3-bis(fluoroimino)hexafluorobutane.
4. Bis(fluoroimino)succinonitrile.
5. 1,2-bis(fluoroimino)cyclohexane.

No references cited.

CHARLES B. PARKER, *Primary Examiner.*
JOSEPH P. BRUST, *Examiner.*